Aug. 29, 1933.    N. M. LOWER ET AL    1,924,562

BEARING MOUNTING FOR CRANK SHAFTS AND THE LIKE

Original Filed May 14, 1927    2 Sheets-Sheet 1

Inventors
Nathan M. Lower
Albert R. Chalker
William G. Bailey
By Tillson Mann & Coy
Attys.

Aug. 29, 1933.   N. M. LOWER ET AL   1,924,562
BEARING MOUNTING FOR CRANK SHAFTS AND THE LIKE
Original Filed May 14, 1927   2 Sheets-Sheet 2
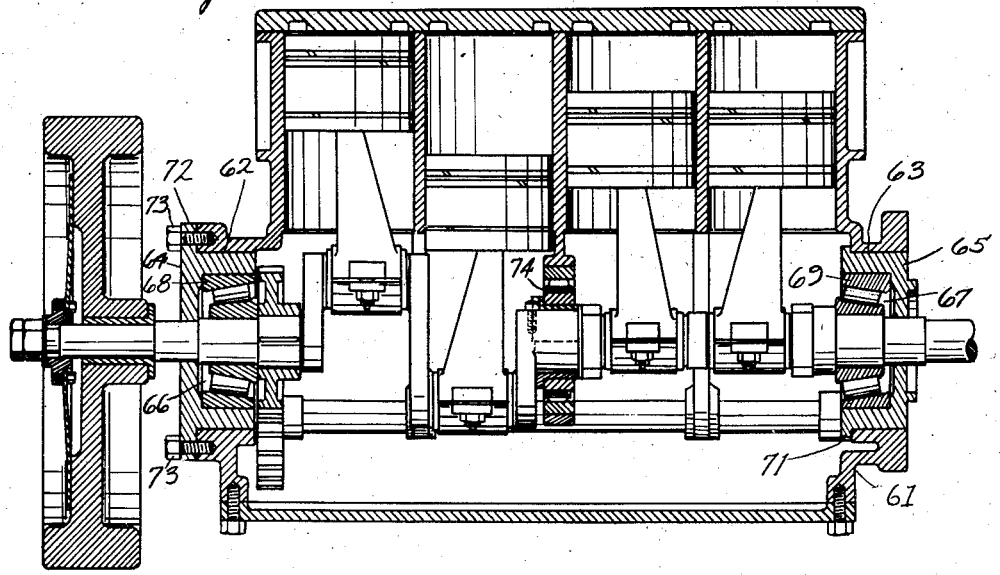
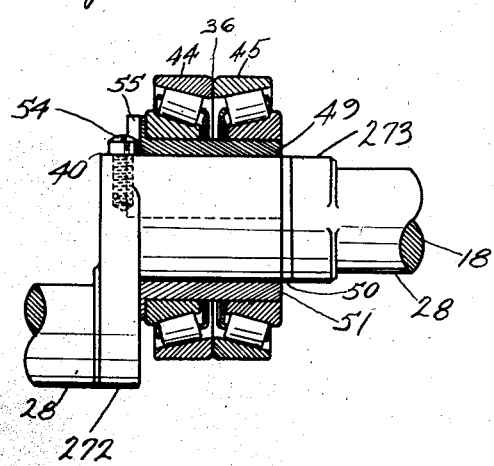
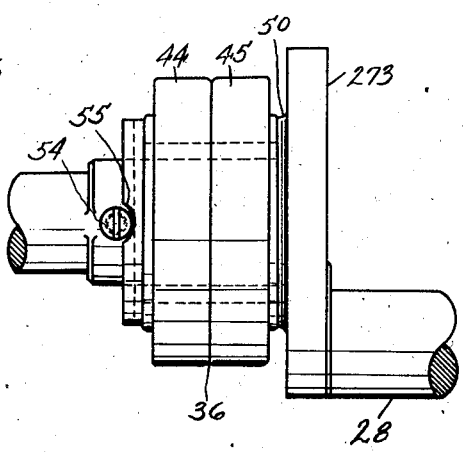
Inventors
Nathan M. Lower
Albert R. Chalker
William G. Bailey
By Gillson Mann & Cox
Attys.

Patented Aug. 29, 1933

1,924,562

UNITED STATES PATENT OFFICE 1,924,562

BEARING MOUNTING FOR CRANK SHAFTS AND THE LIKE

Nathan M. Lower, Crestwood, near Yonkers, N. Y., and Albert R. Chalker, Bellevue, and William G. Bailey, Mount Lebanon, Pa.

Application May 14, 1927, Serial No. 191,482
Renewed October 18, 1932

3 Claims. (Cl. 308—179)

This invention relates to bearings for crank, cam or eccentric shafts and the like.

The principal object of the invention is the provision of a new and improved mounting for intermediate or center anti-friction bearings for one piece crank and like shafts.

Another object of the invention is the provision of a one piece crank shaft adapted to have an annular non-split radial or thrust bearing mounted thereon between the crank arms.

A further object of the invention is the provision of a crank or like shaft with non-split anti-friction bearings between the crank arms, thereby permitting the use of much smaller, more durable bearing surfaces in place of the long heat-generating, short-lived surfaces of plain sleeve bearings, and to consequently provide a more compact machine design carrying a safer and higher bearing load per linear inch of bearing.

Other objects and advantages of the invention will appear from the following description taken in connection with the accompanying drawings, in which Fig. 1 is a longitudinal vertical section through a multi-cylinder engine showing the application of a non-split antifriction radial and thrust bearing on a crank shaft;

Fig. 5 is a detail assembly of the bearing mounting on the shaft with the bearing and bushing shown in section, with parts broken away;

Fig. 6 is a top plan view of Fig. 5; and

Fig. 7 is a longitudinal sectional view illustrating a modified form of bearing mounting.

Figure 1:
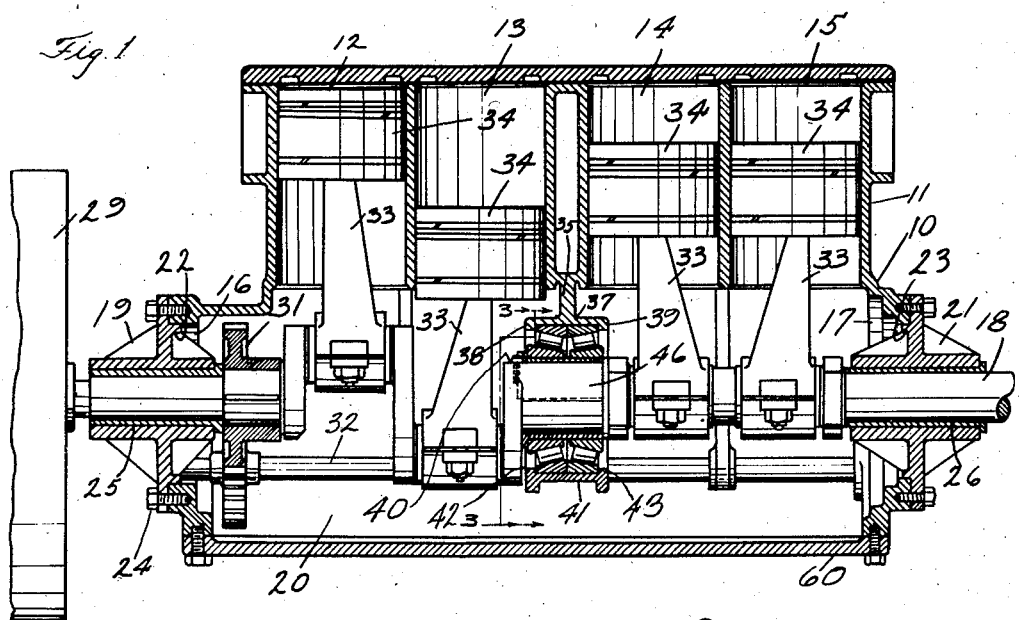

It has been the common practice heretofore in the mounting of crank and like shafts of multi-cylinder engines to provide antifriction bearings only at the ends of the shaft and to arrange them in the form of thrust bearings. The center or intermediate bearings are usually of brass or Babbitt metal in the form of what is known as sleeve bearings. Since the shaft operates at high speeds these sleeve bearings must necessarily be very long in order to provide sufficient bearing surface for carrying the load without undue heating of the bearing surfaces.

It is desirable to employ anti-friction center or intermediate bearings for the crank and like shafts of internal combustion engines, but the balls and rollers for constituting anti-friction bearings are usually mounted in annular cages, and to assemble them in position as intermediate bearings for crank shafts is a difficult problem. It has heretofore been considered necessary to employ a sectional shaft in order to be able to assemble the intermediate antifriction bearings thereon. This is objectionable because it not only weakens the shaft but the journals are more likely to get out of alinement than where the shaft is an integral structure.

The present invention seeks to avoid these difficulties by providing a construction in which a rigid one piece shaft is employed having intermediate anti-friction bearings.

Referring now to the drawings in which similar reference characters are employed to designate the same parts throughout the description, the reference character 10 designates generally an internal combustion engine which is employed by way of example to illustrate one embodiment of the invention. The engine comprises the cylinder block 11 having a plurality of cylinders 12, 13, 14 and 15 therein, and the crank case 20 having the openings 16 and 17 through the ends thereof, through which the crank shaft 18 is adapted to extend.

Suitable means are provided for journaling the crank shaft in the ends of the crank case. As shown, bearing members 19 and 21 are employed for this purpose. These members constitute closures for the openings 16 and 17 respectively and are provided with annular ribs 22 and 23 which are adapted to engage in the openings 16 and 17 respectively for positioning said members, for assuring an alinement of the bearings for the crank shaft, as will presently appear. They are secured in position by any appropriate fastening means as the screws or bolts 24 tapped into the walls of the crank case. The bearing members 19 and 21 are provided with hubs having axial openings in which the sleeve bearings 25 and 26 are secured.

The crank shaft 18 is provided with the integral crank arms 270, 271, 272, 273, 274 and 275 and connecting members or journals 28. The shaft is journaled at the ends of the crank case in the sleeve bearings 25 and 26 and has the usual fly wheel 29 attached to its front end. A gear 31 is secured on said shaft adjacent to the front crank arm 270 for operating the cam shaft 32, as is usual in such constructions.

Suitable connecting rods 33 connect the pistons 34 of the cylinders 12, 13, 14 and 15 with the journals 28 on the crank shaft, in the usual manner.

One or more intermediate antifriction bearings are provided for the crank shaft 18, the number depending on the length of shaft or the number of pistons for operating said shaft.

As shown, a single intermediate antifriction bearing 36 is employed for the crank shaft. The crank case is provided with a split housing or intermediate bearing support 35 for holding said antifriction bearing 36 in position. The upper portion 37 of the housing is rigidly connected to the crank case as by being cast integral therewith, and is provided with inwardly extending retaining flanges 38 and 39 spaced apart for receiving the outer races of the antifriction bearing 36 between them as will presently appear. The lower section 41 of the bearing support or housing having the retaining flanges 42 and 43, is detachably connected to the upper or fixed portion by any suitable means as the bolts or screws 30, see Fig. 3.

The antifriction bearing member 36 is held by the housing or supports between the flanges on the sections 37 and 41, as clearly shown in Fig. 1.

Any suitable antifriction bearings may be employed. In the form of the device shown in Fig. 1, two bearing members having tapered roller bearings are mounted on the crank shaft and held in the housing or support 37 with the outer races 44 and 45 between the retaining flanges. The bearing members are preferably though not necessarily arranged with the tapered ends of the rollers opposed for receiving the thrust on the shaft in either direction.

The antifriction bearing 36 is assembled on the crank shaft before the shaft is placed in position in the crank case in a manner that will now be described.

The intermediate journal portion 46 of the shaft, see Fig. 1, on which the antifriction bearings are mounted is of such diameter that the antifriction bearing may be threaded onto the shaft from one end thereof. The internal diameter of the bearing races is greater than the width of the crank arms, and also greater than the diameter of the shaft. By removing the corners of the crank arms as at 47 the bearings 36 may be moved along the shaft by tilting the same first one way and then another to pass them over the ends of the crank arms. The bearing members may be slid into position from the front end of the shaft before the fly wheel is attached. They are held in position in any suitable manner.

Figure 2:
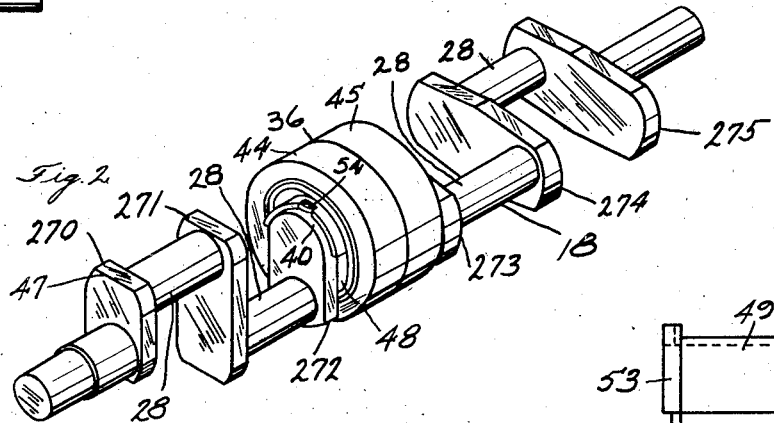
Fig. 2 is a perspective view of a crank shaft with an anti-friction bearing mounted thereon as a center bearing.
Figures 3, 4:
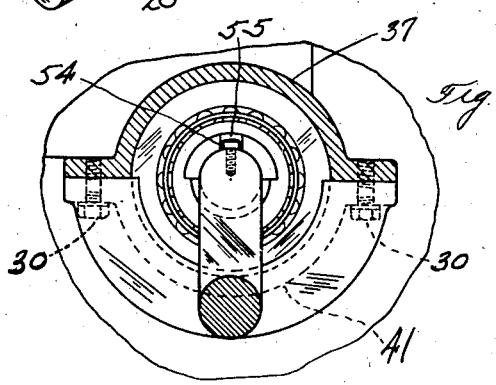
Fig. 3 is a section on the line 3—3 of Fig. 1, showing the split bearing cap.
Fig. 4 is a detail view of the split spacer bushing.

As shown in Figs. 2 and 4, a split cylindrical retaining or spacer sleeve 48 comprising what for convenience will be termed the upper section 49 and the lower section 51, is employed for this purpose. The lower section is placed in position first. It is slid onto the journal portion 46 of the shaft over the inner end or curved portion 40 of the arm 272 beneath the inner races of the antifriction bearing 36 on top of the journal. The inner end of the arm 272 being concentric with the crank shaft as shown at 40 in Fig. 1, and being flush with the cylindrical surface of the shaft at this point, permits this to be done. The sleeve section 51 is then turned to the lower side of the shaft. The other adjacent arm 273 which extends beyond the shaft in all directions is provided with a boss or shoulder 50 for limiting the rearward movement of the sleeve section. When the section is turned to the position shown in Fig. 1 the arm 272 will prevent the section from moving forwardly. The section is preferably provided with a flange 52 which is adapted to engage the front end of the inner race of the forward anti-friction bearing for holding it in position. The upper section 49 of the sleeve 48 is next pressed or lightly tapped in position over the curved surface 40 between the inner bearing races and the journal member 46 of the shaft. The section 49 is provided with a flange 53 for engaging the inner races of the anti-friction bearings for preventing the forward movement thereof along the crank shaft. The sleeve section 49 is held in position by a set screw or bolt 54 threaded into the crank shaft and engaging a notch 55 in the forward edge of the flange 53.

The sleeve sections 49 and 51 frictionally hold the inner bearing races from turning on the shaft and the outer races are held from rotating by being clamped between the sections of the bearing support 35 when the shaft is mounted in the crank case.

The bores 16, 17 and the semicircular bore in the intermediate bearings can all be made at a single operation, thus insuring perfect alinement of the bearings when the parts are assembled.

In assembling the shaft in the engine, the shaft is inserted into the case and through the bearing member 21 from the front, after the bearing member 19 has been removed. The bearing 19 is now passed over the front end of the shaft and secured in position. The fly wheel 29 it attached and after removing the closure 60 of the crank case the lower section 41 is secured in position for holding the outer races 44 and 45 of the bearings 36 in position. The connecting links and pistons may now be attached to the crankshaft and the closure 60 returned to closed position.

In Fig. 7 is shown a modified form of the device in which antifriction bearings are employed at the ends as well as at the intermediate portions of the shaft. In this form of the device the crank case 61 is provided with the alined openings 62 and 63 in which are mounted the bearing members 64 and 65. These members are provided with recesses 66 and 67 for receiving radial and thrust antifriction bearings 68 and 69 the outer races of which are adapted to frictionally and non-rotatably engage the walls of said recess and the inner races of which are fixed to the crank shaft in the usual manner.

The bearing member 65 is provided on its inner end with a flange 71 which will limit its axial movement outwardly. The bearing member 64 is likewise provided with a flange 72 which is adapted to be secured to the crank case by suitable fastening means as the bolts or screws 73.

Since each end bearing is a thrust bearing the intermediate bearing or bearings may be plain roller or ball bearings 74. The antifriction bearing 74 is assembled on the crank shaft in the same manner as described above. The bearing is also secured in position in the crank case in the same manner as the corresponding bearings 36 in Fig. 1, and for that reason it is not thought necessary to repeat that description.

While, as disclosed, the crank shaft is provided with a single intermediate journal, it is understood that a multiplicity of such journals may be employed with antifriction bearings for said journals.

It will be apparent that the internal diameter of the intermediate bearings may be less than the diameter or radial dimension of the crank arms, the bearings being assembled by threading the same onto the crank shaft from one end or the other of said shaft.

It is thought from the foregoing taken in connection with the accompanying drawings that the construction and operation of our device will be apparent to those skilled in the art, and that various changes in size, shape, proportion and details of construction may be made without departing from the spirit and scope of the appended claims.

We claim as our invention:

1. In combination with a crankshaft having a journal and a crank arm at each side of the journal, an antifriction bearing mounted on said journal and comprising nonsplit outer and inner races, the internal diameter of the inner race being greater than the diameter of the journal, a spacer bushing mounted between the journal and said inner race, said bushing being split lengthwise into two parts, said crank arms at one side of the axis of the joural extending beyond the journal and one part of the spacer bushing being disposed and closely fitting between said crank arms, said crank arms on the opposite side of the axis of the journal arranged with one arm extending beyond the journal and with the other being within the confines of the radius of the journal, the other part of the spacer bushing being disposed on the last named side of the axis of the journal with one end thereof contacting the extending arm and means at the other end engaging the other arm to prevent longitudinal movement in one direction of the last named part of the spacer bushing.

2. In combination with a crankshaft having a journal and a crank arm at each side of the journal, an antifriction bearing mounted on said journal and comprising nonsplit outer and inner races, the internal diameter of the inner race being greater than the diameter of the journal, a spacer bushing mounted between the journal and said inner race, said bushing being split lengthwise into two parts of unequal length, said crank arms at one side of the axis of the journal extending beyond the journal and the short part of the spacer bushing being disposed and closely fitting between said crank arms, said crank arms on the opposite side of the axis of the journal arranged with one arm extending beyond the journal and with the other being within the confines of the radius of the journal, the longer part of the spacer bushing being disposed on the last named side of the axis of the journal with one end thereof contacting the extending arm and the other end overlapping the other arm, and a pin extending into the last named arm to prevent longitudinal movement in one direction of the longer part of the spacer bushing.

3. In combination with a crankshaft having a journal and a crank arm at each side of the journal, an antifriction bearing mounted on said journal and comprising nonsplit outer and inner races, the internal diameter of the inner race being greater than the diameter of the journal, a spacer bushing mounted between the journal and said inner race, said bushing being split lengthwise into two parts, said crank arms at one side of the axis of the journal extending beyond the journal and one part of the spacer bushing being disposed between said crank arms, said crank arms on the opposite side of the axis of the journal arranged with one arm extending beyond the journal and with the other being within the confines of the radius of the journal, and the other part of the spacer bushing being disposed on the last named side of the axis of the journal with one end thereof positioned adjacent the extending arm and with the other end overlapping that crankarm which is within the confines of the radius of the journal to prevent rotary movement of the spacer bushing about said journal.

NATHAN M. LOWER.
ALBERT R. CHALKER.
WILLIAM G. BAILEY.